March 7, 1967   C. C. UNGER   3,307,286
AUTOMATIC SPRING ARM FISHING DEVICE
Filed Dec. 22, 1964

Cecil C. Unger
INVENTOR.

BY Clarence A. O'Brien
and Harvey B. Jacobson
Attorneys

United States Patent Office 3,307,286
Patented Mar. 7, 1967

3,307,286
AUTOMATIC SPRING ARM FISHING DEVICE
Cecil C. Unger, % Broadway Imports, Inc., 2nd and Broadway, Harrods Creek, Ky. 40027
Filed Dec. 22, 1964, Ser. No. 420,356
8 Claims. (Cl. 43—15)

This invention relates to automatic hookers and fishhook setting devices and, more particularly, to an improved all mechanical adaptation wherein, after the baited fishhook is taken by the fish and the line is pulled in an attempt to escape, the then tensioned fish line acts on and trips a sensitive trigger latch, releases a spring loaded arm, forcibly yanks the line, sets the hook, and makes the desired catch.

Briefly, the invention is characterized by an elongated plate provided with clips which mount and clasp the bottom of the plate on a fishing rod or pole. This plate provides a common base for the spring-biased arm, line positioning and orienting guide eyes, and a mounting bracket for a pull actuated trigger latch which cocks and sets the arm in its ready-to-function position.

One improvement has to do with the above-mentioned arm. This arm comprises a length of spring steel wire bent upon itself and fashioned into elongated U-shaped form. The rearward ends of the limbs of the arm are formed into coil springs which are anchored on the corresponding rearward end of the base plate. This arm is commensurate in length with the length of the base plate and the bight at the free outer or forward end is bent at right angles and provides a line guide and seat which is uniquely oriented and coordinated with a first line guide affixed to the forward end of the base plate.

This invention also features a U-shaped or an equivalent bracket mounted atop the base plate between spaced first and second line guide eyes and is so arranged that the line can be slidingly threaded through the inner or rearward guide, through the space between the limbs of the U-bracket, through the forward guide eye and then placed in the line seat on the line yanking arm.

Novelty is also predicated on an L-shaped trigger latch whose depending long leg or limb is pivotally hung or suspended in the space between the upstanding limbs of the U-bracket, the lower end of said leg having a notch or kerf for a knotted portion of the line, the short leg or limb at the top of said latch swinging in an arc above the limbs of said bracket and adjustably and releasably hooking over a keeper provided therefor on and between the paired limbs of the line yanking arm. The kerf is properly oriented and aligned with the fore and aft fixed line guide eyes so that the line when pulled trips the trigger with ease and certainty.

The general objective of this invention is to improve upon prior art automatic hookers and, in so doing, to provide a construction which better serves the purposes for which it is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
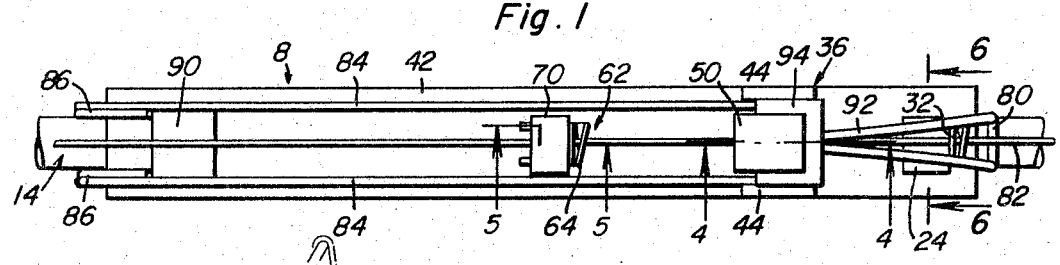
FIGURE 1 is a top plan view of the automatic spring arm fishing device constructed in accordance with the principles of the present invention and showing the same set and in readiness for operation.
Figure 4:
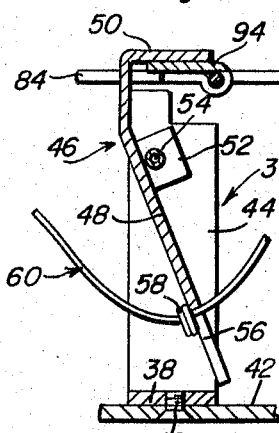
Figure 5:
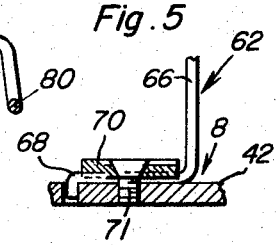
Figure 6:
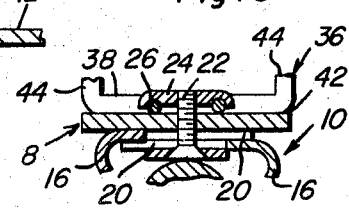

FIGURE 4 is an enlarged view with parts in section and elevation taken on the plane of the section line 4—4 of FIGURE 1; and FIGURES 5 and 6 are fragmentary detail sections taken along the lines 5—5 and 6—6 respectively of FIGURE 1.

Figure 3:
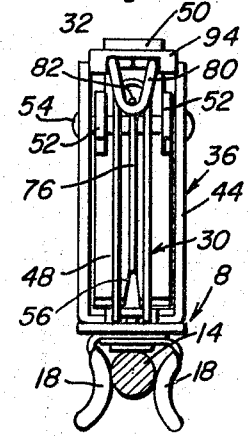
FIGURE 3 is a front end view, that is, a view observing the structure from right to left in FIGURES 1 and 2.

The invention comprises a self-contained ready-to-use attachment characterized in part by an elongated generally rectangular flat-faced plate 8. This plate is relatively long and narrow and is provided on its bottom side with appropriately constructed forward and rearward attaching and retaining clips or clasps 10 and 12. These clips are constructed to permit the plate to be readily attached to and removed from a fishing pole, rod or equivalent support 14. The clips may be of any appropriate construction such as for example as shown in FIGURE 6 wherein it will be noted that the jaws 16 are properly shaped, provided with rubber or equivalent grips 18 (FIGURE 3) and which have overlapped slotted end portions 20 fastened to the plate by a screw or the like 22. It will be noted in this connection that the same screw 22 serves to position and retain a cleat 24 for the lateral terminal end portions 26 of the vertical legs 28 of a first line guide 30. This line guide is formed from the length of wire bent upon itself between its ends with the bight portion of the wire providing a line guide eye 32. This line guide eye is thus located at the outer or forward end portion 34 of the base plate. This line guide eye is elevated above the base plate and coordinates with a rearwardly spaced trigger latch bracket 36. This bracket is preferably U-shaped and formed from strap metal whose bight portion 38 is superimposed upon and fastened as at 40 (FIGURE 4) to the top 42 of the base plate. Thus, the upstanding limbs or arms 44 of the bracket terminate in a plane generally even with the plane of the front guide eye 32. Bracket 36 provides a mount for the trigger latch 46, said latch being generally L-shaped in edge elevation with the depending long arm 48 positioned and swingable in the space between the arms 44. The upper end of the trigger latch, that is the short arm 50, provides a hook-like catch. The leg 48 is provided adjacent its upper portion with laterally directed ears 52 which are pivotally mounted at 54 between the upper end portions of the arms 44. The lower end of the leg 48 is notched to provide a crotch or kerf 56 for the coacting knotted portion of the fishing line 60, as shown in FIGURE 4. A second line guide 62 (similar to the companion guide 30) is provided and is fashioned from a length of wire also bent upon itself to provide an eye 64 and depending portions 66 having laterally bent terminals 68 at their lower ends held in place atop the plate 8 by a hold-down cleat 70 fastened to the top surface 42 in the manner denoted generally at 70 in FIGURE 5. It will be noted that the first or front line guide eye 32 is coordinated and in a plane approximately the same as the pivot point 54 and that the second-named line guide eye 64 is disposed in a lower plane permitting the portion 72 of the line to pass first through the lower eye 64. The portion 74 is threaded between the arms or legs 44 and provided with the knot 58 (FIG. 4) engageable releasably in the crotch of the kerf 56. The then upwardly directed line portion 76 is threaded slidingly through and beyond the front guide eye 32.

The spring steel wire-type link yanking hook setting and automatic fish catching arm is denoted generally at 78. This arm is fashioned from a length of spring steel wire bent upon itself between its ends to provide an elongated U-shaped frame member. The arm is of a length commensurate with the overall length of the base plate and the free forward end portion is bent upon itself to provide an auxiliary U-shaped terminal 80 which constitutes a seat and guide for the coacting portion 82 of the fish line. The limbs 84, that is, the major portions, are arranged in spaced apart parallel relationship as shown in FIGURE 1 and the rear ends are formed into coil springs 86 whose terminals 88 are anchored and held in place by cleat 90 suitably fastened to the base plate and also securing the rearward clip 12 in place. The inherent tendency of the springs is to spring and swing the arm 78 from the full line position shown in FIGURE 2 to the dotted line position when making the catch. The forward limb portions 92 are closely spaced and a clip 94 is secured thereto in the manner shown in FIGURE 4, said clip constituting a keeper for the releasable hooked end of the catch 50 on the aforementioned trigger latch 46. The upper end of the latch passes between the limbs 84 and the hooked catch engages over the keeper plate 94 in the manner shown.

Figure 2:
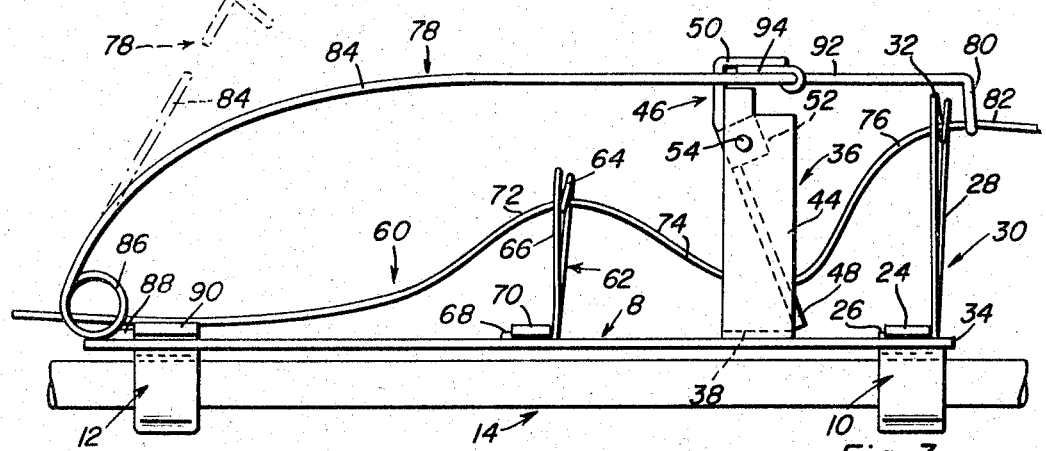
FIGURE 2 is a view in side elevation of the same.

It should be noted, shown in FIGURE 2, that the depending line guide and seat 80 for the portion 82 of the fishing line is positioned in front of and is alignable with the front guide eye 32 when the device is set and accordingly cocked for use. This result is accomplished when the arm 78 is sprung down by hand from its normal released position as shown in full lines in FIGURE 2 and is held in the down position by the acton of the pivoted trigger latch 46. Accordingly, when the arm is set it is placed under tension (1) by the inherent spring properties of the limb portions 84 and (2) by the anchored coil springs 86. Also when the device is set the fishing line 60 is passed first through the space between the two coil springs 86, the portion 72 is slidingly threaded through the inner or rearward guide eye 64, the portion 74 is threaded through the space between the limbs or arms 44 of the bracket 36, the knotted portion 78 is releasably engaged in the crotch or kerf 56. The portion 76 is passed through the eye 32 and the adjacent portion 82 is engaged in the guide and seat 80 at the free springable end of the arm 78.

By reason of the L-shaped construction of the trigger latch 46 it will be seen that the catch 50 can be engaged fully over the keeper plate 94 as indicated in FIGURE 4. On the other hand, the catch 50 could be moved from right to left in FIGURE 4 so that a lesser portion would be engaged with the keeper to render the trip action of the trigger latch more sensitive for action. Experience and experimental use of the device will enable the user to set the device for ever varying angling requirements.

It will be clear that when the fishhook is taken and the line is pulled upon by the fish attempting to escape, the line is tautened with the result that the pull on the knotted portion 58 will trip the trigger latch, will release the catch 50 from the keeper 94 whereupon the constantly tensioned arm 78 will be released and will swing automatically upwardly from the full line to the dotted line position shown in FIGURE 2 and with the result that the hook on the line (not shown) will be set in the mouth of the fish and the catch thus made.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spring loaded automatic fishhook setting and catching device comprising: a base having means thereon adapted to operatively mount the same on a fishing rod or the like, line positioning and guiding eyes carried by said base and through which the fishing line can be slidingly threaded to make a catch, an arm having spring biasing means connecting one end of the arm to said base, the other end of said arm being free, normally springable in a direction away from said base and having a line seating guide oriented and cooperable with said guide eyes and adapted to forcibly yank the line in a manner to set the fishhook in the mouth of the fish, said arm having a keeper spaced rearwardly from said guide, a trigger latch, means pivotally and operatively mounting said trigger latch on said base, said trigger latch having a catch releasably engageable with said keeper, and also having means for engaging a portion of the line therewith in a manner to trip the latch when the fish takes the fishhook and, in so doing, the arm exerts a lengthwise pull on the trippable line, said base comprising an elongated flat narrow plate, said line guiding eyes being spaced longitudinally from each other, said trigger latch being spaced from and situated in the space between said eyes, the means pivotally mounting said trigger latch on said plate comprising a U-shaped bracket having a bight portion secured atop said plate and spaced parallel limbs at right angles to the plane of said plate, said trigger latch being interposed in the space between said limbs and pivotally connected thereto and swingable back and forth in the space between said limbs.

2. The structure according to claim 1, and wherein said catch is located at the upper end of said trigger latch, the means for engaging the line being located at the lower end of said latch.

3. An automatic fish hooker and fishhook setting device comprising: an elongated base plate having forward and rearward end portions and an intervening median portion, a first line guide eye mounted atop said forward end portion, a second line guide eye mounted atop said median portion, a bracket fixed atop the median portion of said plate between said first and second guide eyes, said guide eyes and said bracket being arranged in spaced apart alignment, elongated arm means opposed to said plate, coextensive therewith and having coil spring joined to the rearward end portion of said plate, the median and forward end portions of said arm being normally springable and swingable away from said plate, eyes and bracket, the forward end portion of said arm being free and having line seating and guide means oriented and cooperable with said first guide eye and permitting portions of the line to be slidingly threaded through said guide eyes and seating guide, said arm having a trippable keeper alignable with said bracket, and a trigger latch pivotally mounted in said bracket and having a catch releasably connectable with said keeper, and also having a kerf with which a knotted portion of the line is detachably engageable.

4. The structure according to claim 3, and wherein said bracket is U-shaped and embodies a bight portion superimposed on and affixed to said base plate and limbs disposed at right angles to the plane of said base plate, said trigger latch comprising a member L-shaped in edge elevation, the long limb thereof being suspended and pivoted between the limbs of said U-bracket, the short limb constituting and providing said catch, and said catch overlapping said keeper when set for use and functioning to temporarily hold and set said arm in its line yanking hook setting state.

5. The structure defined in claim 4, and wherein said base plate is provided at forward and rearward end portions with spring means adapted to position and removably retain the plate on and atop a fishing rod, pole, or the like.

6. An automatic fish hooker comprising an elongated base plate having forward and rearward end portions, a line guide eye mounted atop said plate at said forward end portion, a bracket also mounted atop said plate, aligned with and spaced rearwardly from said guide eye, an elongated U-shaped resilient wire member constituting a fish line yanking arm and embodying a bight portion at its forward end laterally bent and providing an upwardly opening line seating guide, and spaced parallel limbs opposed to and coextensive in length with said base plate, the rearward ends of said limbs having coil springs anchored atop the rearward end of said plate, said line seating guide being alignable with and positionable, when in use, in front of said guide eye, a clip secured to said limbs, bridging the space between the limbs, alignable when in use with said bracket and providing a keeper, and a trigger latch pivoted on said bracket and having a lateral catch at an upper end releasably engageable with said keeper, said latch having means with which a knotted portion of the line is trippably and releasably connectable.

7. An automatic fish hooker comprising an elongated base plate having forward and rearward end portions, a line guide eye mounted atop said plate at the forward end portion, a bracket also mounted atop said plate, aligned with and spaced rearwardly from said guide eye, an elongated U-shaped wire member constituting a fish line yanking arm and embodying a bight portion at its forward end laterally bent and providing an upwardly facing U-shaped line seating guide, and spaced parallel limbs opposed to and coextensive in length with said base plate, the rearward ends of said limbs having oil springs anchored atop the rearward end of said plate, said line seating guide being alignable with and positionable, when in use, adjacent said guide eye, a clip secured to said limbs, bridging the space between the limbs and alignable in use with said bracket, said bracket being U-shaped, having a bight portion affixed atop said plate and limb portions projecting at right angles from the plate, and clip providing a keeper and assuming a position above the space existing between said limb portions, and an L-shaped trigger latch the long limb of said latch being pivoted at its upper end between the limbs of said bracket, the lower end of said long limb having a kerf for the fishing line, the short limb being directed forwardly and providing a hook-like catch, the upper end portion operating in the space between the limbs of said arm, and said catch being adapted to hook over said keeper.

8. An automatic fish hooker comprising in combination, a rigid horizontally elongated flat plate constituting a base and adapted to be mounted, when in use, atop a fishing rod, said plate having forward and rearward end portions provided with readily attachable and detachable means capable of holding said end portions in place atop said rod, a first line guide secured atop said forward end portion, a second line guide secured atop a median portion of said plate and aligned with and spaced rearwardly from said first line guide, bracket means also secured atop said plate in line with and between said first and second line guides, an elongated U-shaped resilient wire frame comparable in length with the length of said plate and constituting and providing a bite controlled fish line yanking hook setting arm and having spaced parallel limbs opposed to and generally coextensive in length with said base plate, the forward end portions of said limbs normally arching over said line guides and intervening bracket when said frame is set to make a catch, said forward end portion having a line seating guide spaced from but proximal to said first line guide, the rearward ends of said limbs being anchored on and secured to the coacting rearward end of said plate, a clip secured to said limbs, bridging the space between the limbs, alignable when in use with said bracket and providing a keeper, and a trigger latch pivoted on said bracket and having a lateral catch at an upper end releasably engageable with said keeper, said latch having means with which a knotted portion of the line is trippably and releasably connectable.

References Cited by the Examiner
UNITED STATES PATENTS

| | | | |
|---|---|---|---|
| 1,747,033 | 2/1930 | Shireman | 43—15 |
| 2,658,299 | 11/1953 | Maxfield | 43—15 |
| 2,841,912 | 7/1958 | Eining | 43—15 |

SAMUEL KOREN, *Primary Examiner.*

D. J. LEACH, *Assistant Examiner.*